No. 748,464. PATENTED DEC. 29, 1903.
J. E. BAIRD.
POTATO DIGGER.
APPLICATION FILED NOV. 20, 1902.
NO MODEL. 3 SHEETS—SHEET 1.
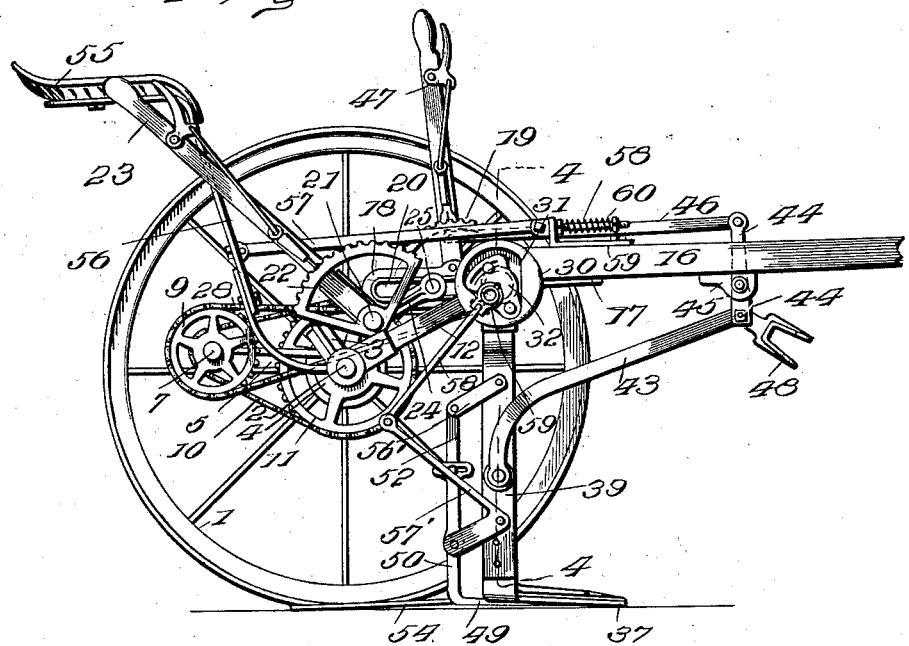
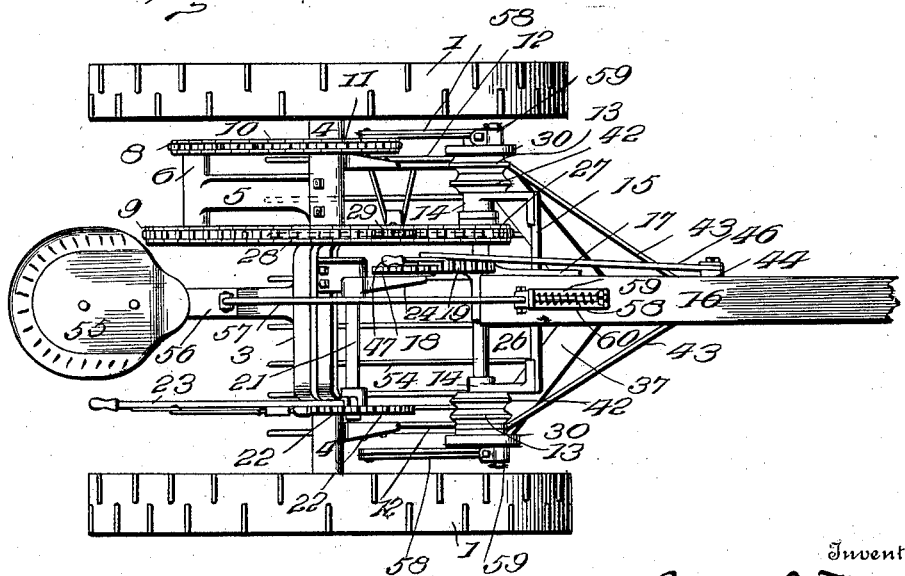
Witnesses
Inventor
John E. Baird
By
Hubert E. Peck
Attorneys No. 748,464. PATENTED DEC. 29, 1903.
J. E. BAIRD.
POTATO DIGGER.
APPLICATION FILED NOV. 20, 1902.
NO MODEL. 3 SHEETS—SHEET 2.
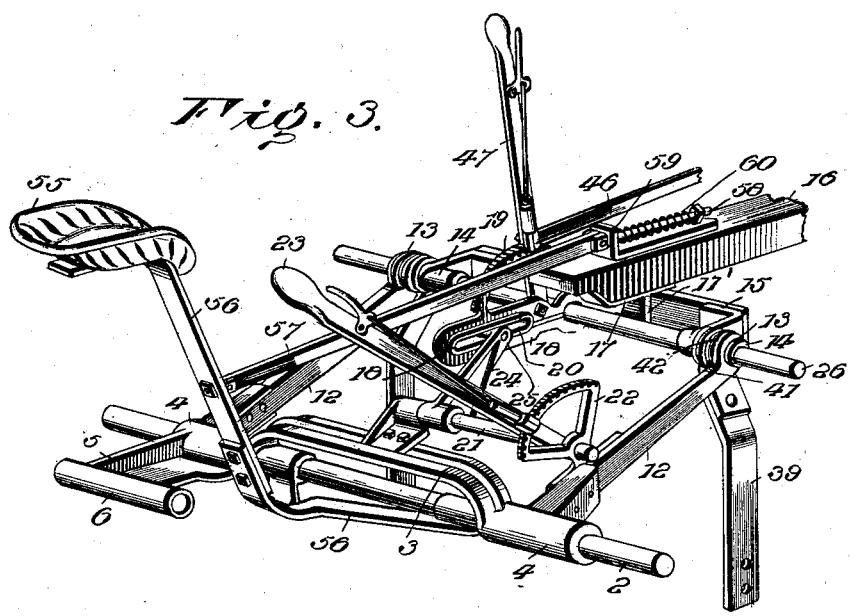
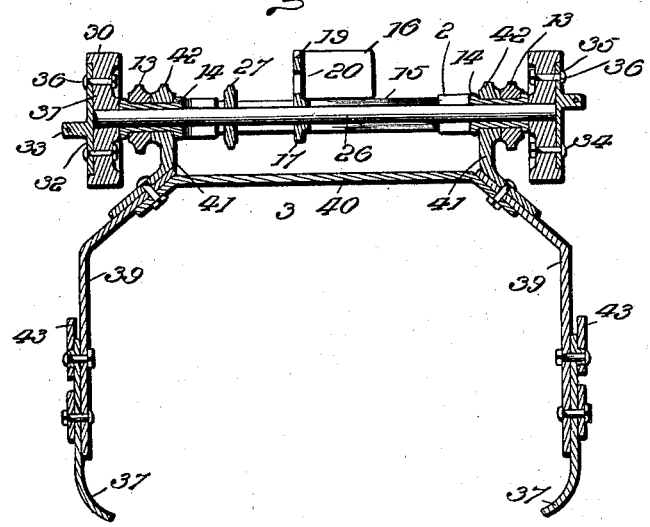
Witnesses
Inventor
John E. Baird

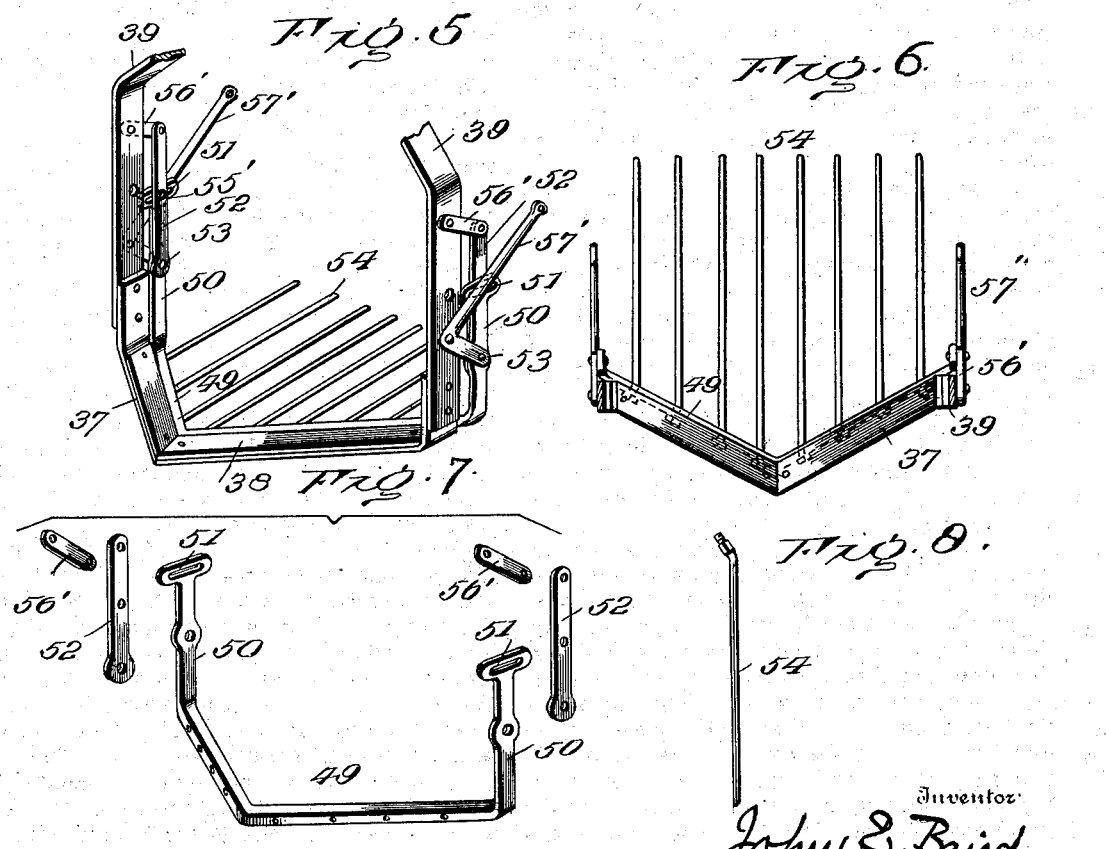

No. 748,464. Patented December 29, 1903.

UNITED STATES PATENT OFFICE.

JOHN E. BAIRD, OF UTICA, NEW YORK.

POTATO-DIGGER.

SPECIFICATION forming part of Letters Patent No. 748,464, dated December 29, 1903.

Application filed November 20, 1902. Serial No. 132,132. (No model.)

*To all whom it may concern:*

Be it known that I, JOHN E. BAIRD, a citizen of the United States, residing at Utica, Oneida county, New York, have invented certain new and useful Improvements in Potato-Diggers; and I do hereby declare the following to be a full, clear, and exact description of the invention, such as will enable others skilled in the art to which it appertains to make and use the same.

This invention relates to certain improvements in potato-diggers, and more particularly to that type of potato-digger which is mounted on wheels and provided with a vibrating separator in rear of the plow and receiving the soil and potatoes passing over the same.

An object of the invention is to provide certain improvements in construction and arrangements of parts for the purpose of simplifying and increasing the efficiency of the machine.

The invention consists in certain novel features of construction and in combinations of parts, as more fully and particularly specified and pointed out hereinafter.

Referring to the accompanying drawings, which merely show for purposes of explanation an example of one form of my invention from among others, Figure 1 is a side elevation of the machine, one supporting-wheel being removed. Fig. 2 is a top plan view of the machine. Fig. 3 is a detail perspective view showing portions of the framework, the raising and lowering mechanism, and the rear portion of the tongue, the drive-wheels, gearing, the plow, separating device, and its operating means not being shown. Fig. 4 is a vertical sectional view taken in the plane of the line 4 4, Fig. 1, showing the plow-standards and the means for hanging and supporting the same and the separator-operating crank-shaft. Fig. 5 is a detail perspective of the plow or shovel and the separator mechanism carried thereby, parts being broken away. Fig. 6 is a top plan view of the parts shown in Fig. 5. Fig. 7 is a detail perspective view of the separator-head and links separated from each other, the tines and rocking elbow-levers not being shown. Fig. 8 is a detail elevation of one of the separator or shaker tines.

In the drawings, 1 represents the supporting and drive wheels, carrying and mounted on the straight axle 2.

3 is a frame-casting arranged longitudinally of the axle 2 and between the drive-wheels 1. This frame member 3 is formed with the tubular end portions 4, through which the axle 2 loosely passes, so that the frame can rock on the axle. The tubular portions 4 are connected by the upwardly-arched portion of the casting, arranged longitudinally of and above the axle, as shown in Fig. 3. 5 is an arm usually forming part of said frame-casting and extending rearwardly from one of the tubular portions 4 thereof. The rear portion of the arm 5 is formed with the tubular box 6 parallel with the tubular portions 4 and receiving and forming the journal-box for a counter-shaft 7, extending through the said box 6 and at one end provided with a sprocket-pinion 8 and at the opposite end with a sprocket-wheel 9. The counter-shaft 7 is rotated by the sprocket-chain 10 from the pinion 8 to a sprocket-wheel 11, driven by the forward rotation of the drive-wheels 1 and mounted on and fixed to the axle 2. The sprocket-wheel 9 of the counter-shaft 7 is operatively connected, as hereinafter set forth, to actuate the separator or shaker mechanism. The tubular end portions of said frame member 3 are provided with forwardly-projecting radial arms 12. In the specific example illustrated each arm 12 consists of a forwardly-projecting radial socket integral with the frame member 3 and an elongated plate at its rear end fitted in and bolted rigidly to said socket. The forward ends of the radial arms 12 are formed with transverse openings 13, loosely embracing and confined on the end hubs 14 of a U-shaped yoke 15. The yoke 15 is formed of a transverse horizontal bar rigid with rearwardly-extending ends, which at their rear extremities are formed with the hubs 14. The transverse bar of the yoke is arranged a distance in advance of the tubular portions 14, and suitable means are provided for securing the rear end of the tongue 16 to the front bar of said yoke, with the tongue arranged transversely thereof and centrally between the two hubs 14. For instance, I show a metal socket 17, rigidly secured to the under portion of the rear end of the tongue and resting on the transverse front bar of said yoke and provided with a depending flange 17, rigidly bolted or otherwise secured to said front bar of said yoke, so that the rear portion of the tongue 16 is rigidly secured to said yoke or frame member. I show the casting 17 formed integral with an elongated rearward extension 18 and with a vertically-disposed toothed sector 19. The rearward extension 18 is longitudinally slotted, as shown at 20.

21 is a lifting rock-shaft arranged parallel with the axle 2 and mounted in journal-boxes, one of which is secured to and projects forwardly from the arched portion of the frame member 3, while the other is secured to one of the radial arms 12. 22 is a toothed sector rigid with the radial arm 12, provided with said journal-box.

23 is a hand-lever rigid with the rock-shaft 21 and extending upwardly adjacent to the driver's seat and so arranged as to be readily accessible to the driver. This hand-lever is provided with any suitable spring hand-clip and catch mechanism to coöperate with the toothed sector 22 in locking the lever 23 and the rock-shaft 21 against movement independently of the radial arms and frame member 3. The rock-shaft 21 is provided with a crank-arm 24, extending upwardly and forwardly beside the slotted rearward extension 18 of the tongue, and said crank-arm is provided with a stud 25, extending into the slot 20 of said extension 18 and arranged to move longitudinally of said slot as the crank-arm 24 moves vertically.

26 is a rotary crank-shaft parallel with the axle 2 and passing loosely through and mounted to freely revolve in the hubs 14 of the yoke or frame 15 rigid with the tongue. Said crank-shaft passes loosely through an opening in the rearward extension 18 of the tongue and at both ends projects outwardly beyond the outer ends of the hubs 14. Between the hubs 14 the said crank-shaft 26 is provided with a sprocket-pinion 27, rigid therewith and connected with the sprocket-wheel 9 of the counter-shaft 7 by sprocket-chain 28, so that the crank-shaft is continuously rotated as the machine moves forward by sprocket-wheel 11 through the medium of the counter-shaft 7 and the sprocket and chain gearing hereinbefore described.

29 is a chain-tightener bearing down on the sprocket-chain 28 and carried by a bracket secured to one of the radial arms 12.

In the specific example illustrated both ends of the crank-shaft 26 are provided with eccentric connections to the shaker or separator arranged in the rear of the plow or shovel. As an example of what might be employed for this purpose, I show crank-disks 30, rigidly secured to the ends of the crank-shaft 26. The outer vertical face of each crank-disk 30 is formed with a triangular-shaped depressed seat 31, receiving the flat adjustable approximately triangular crank-plate 31.

37 is the narrow flat plow or shovel blade, arranged transversely of the machine and preferably between its ends centrally projecting forwardly, usually in the form of a V, with the advanced central front point and the legs of the V-blade extending rearwardly and outwardly about at right angles to each other. The ends of the blade are extended upwardly at right angles or approximately at right angles. Usually I form this blade of a single piece of flat metal.

If desired, I can secure the shares 38 on a V-shaped cutting portion of the plow blade or shovel to form the removable working portion thereof to permit renewal when desired. I show two shares 38, secured on top of the blade and extending from the ends thereof to and meeting at the point. However, I do not wish to limit myself to the employment of two shares nor to the employment of one or more shares nor to the specific shape of the plate or shovel.

The upturned ends of the blade or shovel are rigidly secured to the upwardly-extending standards 39, which are usually deflected toward each other at their upper ends and rigidly secured together at their upper ends by the cross-piece 40, located usually just beneath and parallel with the crank-shaft 26. The plow-standards 39 have upwardly-extending brackets 41 rigidly secured thereto, and at their upper ends said brackets are formed with transverse hubs 42, surrounding and mounted to turn on the hubs 14, respectively, of the tongue-frame 15. The hubs 42 of the plow-standards are located on the hubs 14 beside the hubs 13 of the radial arms 12, and said hubs 14 are suitably formed or provided exteriorly with flanges, confining said hubs 13 and 42 thereon against longitudinal movement and so as to permit the hubs 14 to turn within the hubs and the hubs to turn on the hubs.

43 represents draft-links, at their rear ends pivotally secured to the hangers of the plow blade or shovel and from thence converging and extending forwardly and upwardly to a point beneath the tongue and in advance of the rear end of the tongue. The front ends of these draft-links 43 are pivotally secured to the lower end of a rocking lever 44, carried by and fulcrumed in a casting 45, rigidly secured to the under side of the tongue 16. This vertically-disposed rocking lever 44 is mounted to swing on a horizontal axis and is formed with an upwardly-extending arm pivotally joined to the front end of a link 46, which extends rearwardly and is pivotally joined to an upright hand-lever 47 at its lower end fulcrumed to the rearward extension 18 of the tongue. This hand-lever 47 extends up beside the toothed sector 19 and is provided with a spring-controlled hand-clip and dog coöperating with the sector 19 to hold the lever 47 in the desired position and to permit the same to be swung forwardly or rearwardly when the dog is released from the sector.

48 is a clevis to which the draft-animals are attached. I locate this clevis in the specific example illustrated beneath the tongue and loosely couple the same to the lower end of the rocking lever 44 and to the front ends of the two draft-links 43. It will hence be noticed that the vertically-disposed frame-hangers, which carry and are rigid with the narrow flat blade or shovel, are mounted to swing on the hubs 14 and are maintained at the desired angle by the levers 47 and 44 and the links 46 and 43. By swinging the hand-lever 47 rearwardly the lever 44 will be rocked to draw the draft-links 43 forwardly, and thereby swing the hangers 39 forwardly and elevate the point of the shovel or blade. By swinging the hand-lever 47 forwardly the lever 44 will be rocked to throw the draft-links 43 rearwardly, and thereby swing the plow-hangers 39 to move the shovel or blade to a position with its point depressed or directed downwardly.

The separator is carried by and varies its angle with the shovel-hangers, and hence the separator moves vertically with the shovel as the vertical position thereof is varied.

In the specific example illustrated the separator consists of a V-shaped head 49, arranged behind and longitudinally conforming to the longitudinal shape of the shovel—that is, the horizontal rearwardly-diverging portions of the V-shaped head are parallel with and arranged close behind the horizontal rearwardly-diverging portions of the shovel, so that the separator has a central front point extending practically up to the front of the point of the shovel. 54 represents the usually parallel rearwardly-extending tines, at their front ends rigidly secured to the said horizontal V-shaped portion of the head 49. Said tines can be secured to said head in any suitable manner and by any suitable means. I show the head formed with transverse holes, through which the laterally-bent ends of the tines can extend and into which they can be tightly and rigidly drawn by nuts on their threaded projecting front extremities. If desired, the front end of each tine can be slightly tapered and angular in cross-section to cause the same to more firmly lock in the head against turning. The tines usually extend rearwardly such a distance that their rear ends all end in approximately the same transverse plane, and the tines are spaced a suitable distance apart to permit the soil to sift therethrough and yet so as to retain the potatoes thereon and drop the same at the rear ends of the tines and on the top surface of the soil.

The rear ends of the head 49 are bent upwardly approximately at right angles and are arranged vertically in rear of and approximately parallel with the shovel-hangers, forming uprights 50. Each portion 50 at its upper extremity is formed with a transverse elongated slot 51, extending horizontally in the line of draft of the machine.

52 represents two plates parallel with and forming upward extensions of the uprights 50 of the separator-head. These extensions 52 longitudinally lap the uprights 50 of said head and extend transversely across the slots 51 and suitable distances above said uprights 50. The lower ends of the extensions 52 are secured to the uprights 50 a distance below the slots 51 by transverse pivot-bolts 53. Clamping-bolts 55' pass through the slots 51 and through said extensions to normally clamp the uprights 50 to said extensions. 56' represents short vertically-swinging horizontally-disposed links at their front ends pivoted to the shovel-standards and at their rear ends pivoted to the upper ends of said uprights 50.

57' represents vertically-swinging bell-crank levers at their angles fulcrumed to the shovel-hangers, with their horizontally-disposed short arms extended rearwardly and pivotally joined to the uprights of the separator-head about at the lower ends of the extensions 52, if desired, by the same bolts 53 confining the lower ends of extensions 52 to the separator-head uprights. Usually the short ends of levers 57' are parallel with links 56', and the separator is connected to the shovel-hangers and is carried by links 56' and levers 57'.

The long arms of levers 57' extend upwardly and rearwardly and at their upper ends are pivotally joined, respectively, to the lower ends of pitmen 58, extending upwardly and secured to the sleeves 59, loosely confined on the crank-pins 33.

The rotation of the crank-shaft will through the medium of the pitmen and levers 57' reciprocate or vibrate the separator vertically, and by reason of the peculiar arrangement of the parts the front end of the separator will have approximately the same range of vibration as the rear end of the separator. The links 56', in connection with the short ends of the levers 57', will act as a parallel link movement in carrying the entire separator vertically, as just described, and giving the front end of the separator the extensive vibration desired.

The angle of the separator can be independently adjusted, if desired, with relation to the shovel and its hangers by means of the extensions 52 and the clamping-bolts 55' passing through elongated slots 51. By loosening said bolts 55' the separator can be independently tilted, swinging on bolts 53, and the slotted portion 51 sliding on bolts 55'. When the separator has been tilted to the desired angle with respect to the shovel, the bolts 55' are tightened, thereby clamping the extensions 52 rigidly to the separator-head uprights 50 and holding the separator at the desired angle with respect to the shovel. I do not, however, wish to limit my invention to the specific means shown for permitting the independent angular adjustment of the separator, nor, in fact, to the employment of such means in all forms of machines within the scope of my invention. Also the two crank-pins of the adjustable crank connections can be set to work together, or, if desired, they might be set to work oppositely, and hence impart a lateral tilting vibration to the separator as well as the vertical reciprocation. It should be noted that the separator extends up almost to the very front point of the shovel and that this front end of the separator is vibrating vertically, and hence that the mass of soil and potatoes the instant it leaves the narrow shovel-point passes onto the front vibrating end of the separator and is subjected to the sifting and separating process. The greatest mass of material to be separated passes over the shovel at its central point, and the soil will clog and wedge at the point of the shovel and pass rearwardly over the separator in a mass and with a rush without being separated unless means are provided to shake up and sift out the soil at the very point of the shovel almost at the instant that said point enters and lifts the soil. By extending the center of the separator forwardly into the point of the shovel, leaving but a narrow edge of shovel, and by thoroughly vibrating this advanced front end of the separator clogging is avoided and the separator is enabled to take care of and sift the soil thoroughly from the potatoes. The separator is formed to have its greatest capacity and efficiency at the portions where the largest amount of material is to be handled.

I preferably so arrange the drive-wheels with respect to the shovel-hangers as to press down and hold weeds, grass, and vines from hanging and collecting on the said hangers. The wheels 1 are, to accomplish this purpose, arranged close to said upright, so as to press down and pull from the said hangers vines and trash which collect thereon.

55 is the driver's seat, arranged in rear of the vertical plane of the axle 2 and carried by downwardly and forwardly extending seat-support 56, having eyes at its lower end loosely mounted on the central portion of the axle 2 beneath the arch of the frame member 3. The seat-support is yieldingly upheld by the link 57 at its rear end pivotally joined to the upright portion of the seat-support and at its front end extending forwardly over the rear end of the tongue and pivotally joined to the rear end of the sliding bolt 58, arranged above and longitudinally of the tongue and confined by a plate 59, secured to the tongue and surrounded by a coiled spring 60, yieldingly holding the bolt 58 and the link 57 forwardly to uphold the seat-support and permit the same to yield rearwardly and the lower end of the seat-support to rock on the axle.

It will be observed that the frame of the machine swings on the axle of the drive-wheels and extends forwardly and is loosely coupled to the tongue, or more particularly to the frame or yoke rigidly secured to the tongue, and that the plow-blade or shovel-hangers are loosely coupled to the frame at the joints between the frame and tongue. Hence the vertical position of the plow-blade and its separator can be varied by raising and lowering the tongue and frame, so that the joints between the same will move vertically. This action is attained through the medium of the hand-lever 23 rigid with the rock-shaft 21, which is carried by the frame fulcrumed or swinging on the axle and provided with the crank-arm having the projections confined in the slotted member rigid with the rear end of the tongue and located in rear of the vertical plane including the axis of the two joints between the front end of the swinging frame and the frame or yoke rigid with the tongue. When the hand-lever 23 is moved forwardly, the crank-arm 24 will depress the rear end of the tongue, and the frame mounted on the axle will swing downwardly with the tongue, thereby moving the plow-blade or shovel downwardly and the parts can be locked in the desired positions by the dog of the lever 23 in engagement with the toothed sector 22. When the hand-lever 23 is swung rearwardly, the crank-arm 24 will move upwardly, and thereby lift the rear end of the tongue and swing the frame upwardly on the axle and elevate the plow-blade or shovel. The plow-blade or shovel can thus be elevated above ground and the parts locked in this position for transportation and the plow-blade can be adjusted vertically to work at any desired depth and locked in the desired position.

Through the medium of the hand-lever 47 the angle or inclination of the plow-blade can be varied independently of the frame-adjustments and whatever the vertical position of the plow-blade.

As the shovel-hangers swing on the axis of the crank-shaft, the angle of the separator-tines with respect to the shovel will not be varied by swinging said hangers to vary the angle of the plow.

Advantages are attained by forming a narrow angular blade or shovel for the purpose of reducing to a minimum the surface of shovel which must pass through the soil before the separator receives the broken-up soil and potatoes. It is obvious that the separator mechanism can be varied in construction and arrangement and that my invention is not limited to the employment of the adjustable crank mechanism nor to the employment of two coacting or oppositely-acting crank connections. Also I do not wish to limit my invention to the arrangement or construction of driving-gearing employed.

When a driver's seat is employed, arranged, as shown, in rear of the axle with a connection forwardly to the tongue, the weight of the driver tends to balance the machine on the axle and aids in adjusting the same to elevate the rear of the tongue and the shovel.

Though I refer to the shovel and separator-head as V-shaped throughout the foregoing description, it is to be understood that I do not desire to limit myself to a literal embodiment thereof, as any shape having an approximately pointed end and somewhat divergent sides would fully perform the important duties incident to this detail of my invention.

It is evident that various changes and modifications might be made and resorted to in the forms, constructions, and arrangements of the parts described without departing from the spirit and scope of my invention. Hence I do not wish to limit myself to the exact construction disclosed.

Having thus described my invention, what I claim is—

1. In combination, a wheeled axle, a frame mounted to swing thereon and extended forwardly, a draft-tongue at its rear jointed loosely to the front of said frame, a shovel-hanger at its upper end loosely confined to the frame and tongue at said joint and provided with a shovel, and means to swing the frame vertically on the axle and raise and lower the front thereof and the rear of the tongue, substantially as described.

2. In combination, a wheeled axle, a vertically-swinging frame mounted on the axle, a tongue, a yoke rigidly secured to the tongue and loosely coupled to the front of said frame, a lifting-shaft carried by the frame and provided with a hand-lever and locking mechanism and a crank-arm engaging a part rigid with the rear of the tongue, and a shovel hung from the joint between the frame and yoke, substantially as described.

3. In combination a wheeled axle, a frame mounted to rock thereon and having forwardly-projecting radial arms, a tongue, a yoke rigid with the tongue and loosely jointed to said arms, a shovel hung from said yoke and arms at the joint between the same, and means for swinging the arms and tongue vertically to raise and lower the shovel, substantially as described.

4. In combination, a wheeled support, a frame mounted to swing on the support and provided with forwardly-extending arms, a tongue loosely coupled to the front ends of said arms to swing vertically therewith, means to swing the arms and tongue vertically, and a shovel provided with hangers loosely joined to the arms and tongue at the coupling between the same, substantially as described.

5. In combination, a wheeled axle, a frame mounted to rock thereon and extending forwardly therefrom, a tongue provided with a yoke rigid therewith and loosely jointed to the front of said frame, a slotted member rigid with and extending rearwardly from the tongue, a lifting rock-shaft carried by the frame and provided with a hand-lever and a crank-arm provided with a projection confined in the slot of said member, and a shovel provided with hangers loosely coupled to the front of said frame and moved vertically with the same, substantially as described.

6. In combination, a wheeled axle, a vertically-swinging frame comprising a tubular portion receiving said axle and capable of rocking thereon and forwardly-extending arms, a draft-tongue, a lateral yoke rigid with the draft-tongue and having hubs on which the front ends of said arms are confined, a shovel having hangers confined on said hubs, and means for swinging said frame vertically to raise and lower the shovel, substantially as described.

7. In combination, a wheeled axle, a vertically-swinging frame mounted and rocking on the axle and extending forwardly, a draft-tongue, means pivotally joining the rear portion of the draft-tongue to the front of said frame, a shovel having hangers hung from the front of said frame, means determining the angle or inclination of the hangers and shovel, and a lifting device between said frame and tongue for raising and lowering the frame to determine the vertical position of the shovel, substantially as described.

8. In combination, a wheeled axle, a vertically-swinging frame extending forwardly from and mounted to turn on the axle, a draft-tongue, a yoke rigid therewith and pivotally joined to the front of said frame, a member rigidly secured to the rear end of said tongue and formed with a longitudinally-slotted rearward extension, a lifting rock-shaft parallel with the axle and mounted on said frame and provided with a crank-arm having a portion projecting into said slot of said extension, means for rocking and locking said shaft, and a shovel having hangers hung from the front of said frame, substantially as described.

9. In a potato-digger, the combination of a wheeled axle, a draft-tongue, a vertically-swinging frame confined to rock on said axle and at the front pivotally joined to the rear of said tongue, a shovel having hangers hung from the front of said frame, and means for swinging the frame and rear of the tongue vertically, substantially as described.

10. In a potato-digger, the combination, of a wheeled axle, a draft-tongue having a yoke rigidly secured thereto and at its rear ends formed with alined hubs, a vertically-swinging frame mounted to rock on the axle and at the front receiving and mounted to turn on said hubs, a shovel having hangers confined on said hubs, and lifting means between the frame and tongue for swinging the same vertically to raise and lower the shovel, substantially as described.

11. In a potato-digger, the combination of a wheeled axle, a draft-tongue, a vertically-swinging frame mounted to rock on the axle, means pivotally joining the front of the frame and the tongue, means for swinging the frame vertically, a shovel having hangers hung from said means, a vibrating separator carried by said hangers, a rotary shaft carried by said means and having eccentric operating connections to said separator, and actuating connections for said shaft, substantially as described.

12. In a potato-digger, the combination of a wheeled axle with a vertically-swinging frame confined to rock on said axle, a draft-tongue, a yoke rigidly secured to the draft-tongue and having alined hubs at its rear end loosely fitted in the front ends of said frame, a shovel having hangers fitted on said hubs, a vibrating separator carried by said hangers, a rotary crank-shaft passing through and mounted in said hubs and having operating connections to said separator, driving connections between the axle and said shaft, and means for swinging said frame vertically to vary the vertical position of the shovel, substantially as described.

13. In a potato-digger, in combination, a wheeled axle, a vertically-swinging frame mounted to rock on the axle, a draft-tongue, a yoke having rearwardly-extending ends formed with hubs loosely fitted in the front ends of the said frame, a casting rigidly secured to the rear end of the draft-tongue and rigidly secured to the front of said yoke and formed with a longitudinally-slotted rearward extension, a lifting rock-shaft carried by the frame and provided with a crank-arm loosely confined in the slot of said extension, said shaft provided with a hand-lever and locking means, and a shovel provided with hangers at their upper ends confined on said hubs, substantially as described.

14. In a potato-digger, in combination, a wheeled axle, a vertically-swinging frame rocking thereon, a draft-tongue pivotally joined to the front ends of the frame, means for swinging said frame vertically, a swinging seat-support carrying a seat and at its lower end mounted to rock on the axle, and a spring connection between the tongue and the seat-support to yieldingly uphold the same, substantially as described.

15. In a potato-digger, in combination, a frame, a draft-tongue, a wheeled axle, a vertically-swinging seat-support carrying a seat and at its lower end loosely mounted on the axle to rock thereon, and a forwardly-extending longitudinally-movable spring-held connection attached to the seat-support and yieldingly upholding the same, substantially as described.

16. In a potato-digger, in combination a wheeled axle, a vertically-swinging frame comprising a tubular portion on the axle and a rearwardly-extending arm and forwardly-extending arms, a draft-tongue having a yoke rigidly secured thereto on which the front ends of said forwardly-extending arms are loosely confined, means for swinging said frame vertically, a shovel having hangers loosely confined to said yoke, means for determining the angle or inclination of the hangers and shovel, a vibrating separator carried by the hangers, a rotary crank-shaft mounted in said yoke and having operating connections with said separator, a counter-shaft mounted in said rearward arm, and driving connections from the axle to the counter-shaft and from the counter-shaft to the crank-shaft, substantially as described.

17. In a potato-digger, in combination a wheeled frame a draft-tongue, a shovel having hangers pivotally connected to the frame and a vertically-swinging lever carried by the tongue, draft connections from the hangers to said lever, means for attaching the draft to said lever, and means for swinging the lever and locking the same in the desired position, substantially as described.

18. In a potato-digger, in combination, a wheeled frame, a draft-tongue, a shovel provided with hangers loosely joined to the frame, a vertically-swinging lever carried by the tongue, draft connections from the hangers to the lower portion of said lever, an upright hand-lever arranged at the rear of the tongue and provided with locking means, and a connection from said hand-lever to the upper end of said vertically-rocking lever, substantially as described.

19. In a potato-digger, in combination a wheeled axle, a vertically-swinging frame mounted thereon, a draft-tongue having a yoke rigidly secured to the rear thereof and at its rear end formed with hubs loosely fitted in the front end of the swinging frame, means for vertically swinging said frame, a shovel having hangers confined to rock on said hubs, a separator carried by said hangers, a crank-shaft extending through said hubs and rotating therein and at both ends having adjustable crank mechanisms connected to actuate said separator, means for rotating said crank-shaft and means for holding said hangers at the desired angle, substantially as described.

20. A potato-digger having a transversely-arranged angular narrow shovel-blade, hangers secured to the ends of the blade, a vibrating separator at its front end projected centrally forward into the point of said blade, and means to vertically vibrate the front and rear ends of said separator, substantially as described.

21. In a potato-digger, in combination, a frame, a shovel having hangers at their upper ends mounted to swing on the frame, means for holding the hangers in the desired position, a rotary crank-shaft concentric with the axis on which said hangers swing, adjustable cranks at both ends of said shaft, a vibrating separator having end hangers loosely connected with said shovel-hangers, and vibrating connections from said cranks to said separator-hangers, whereby said cranks can be independently adjusted, substantially as described.

22. In combination, a shovel having end hangers, a separator-head having upright ends, upward extensions pivoted to said ends, means for adjusting the angles of said extensions with respect to said ends, parallel links connecting said extensions to said shovel-hangers, and means for vertically reciprocating said separator, substantially as described.

23. In a potato-digger, a separator having a V-shaped forward end and a V-shaped shovel arranged in front of the separator but free of connection therewith, whereby the separator and shovel are adapted for independent adjustment and movement.

24. A potato-digger having a shovel comprising a V-shaped blade, a separator having its forward end shaped to conform to the V shape of the shovel, and means to reciprocate the separator without affecting the shovel.

25. A potato-digger having a V-shaped shovel, a separator having its forward end shaped to conform to the shape of the shovel but without connection therewith, and means to adjust the shovel.

26. A potato-digger having a transversely-arranged narrow shovel-blade, a vibrating separator projected centrally forward into the point of the shovel, and without connection with the shovel and means to vibrate the separator.

27. A potato-digger provided with a transversely-arranged V-shaped shovel, a separator-head of V shape to conform to the rear outline of the shovel, and tines projecting from said separator-head, the head and shovel being independent to permit independent operation and adjustment.

28. In a potato-digger, a frame, a shovel, hangers therefor mounted on the frame, a separator, hangers for the separator pivotally supported from the shovel-hangers, and means to move said separator-hangers vertically to vibrate the separator.

29. In a potato-digger, a shovel, hangers therefor, a separator, hangers for the separator, and connections between the separator-hangers and shovel-hangers to permit the independent adjustment of the separator with relation to the shovel.

30. In a potato-digger, a shovel, hangers therefor, means to independently adjust the inclination thereof, a separator pivotally supported by the shovel-hangers, and means to independently adjust the inclination of the separator.

In testimony whereof I affix my signature in presence of two witnesses.

JOHN E. BAIRD.

Witnesses:
JOHN A. MCGREGOR,
GEO. E. LA DUE.